(12) United States Patent
Tyson et al.

(10) Patent No.: US 10,447,868 B2
(45) Date of Patent: Oct. 15, 2019

(54) PORTABLE ELECTRONIC DEVICE WITH CREATIVE ARTWORKS PICTURE APPLICATION OPERATING IN RESPONSE TO GEOFENCING

(71) Applicant: COLORVISION INTERNATIONAL, INC., Orlando, FL (US)

(72) Inventors: Henry Tyson, Orlando, FL (US); Mark Simmons, Orlando, FL (US); Bryan Wilkins, Sanford, FL (US)

(73) Assignee: Colorvision International, Inc., Orlando, FL (US)

( * ) Notice: Subject to any disclaimer, the term of this patent is extended or adjusted under 35 U.S.C. 154(b) by 0 days.

(21) Appl. No.: 15/876,475

(22) Filed: Jan. 22, 2018

(65) Prior Publication Data

US 2018/0146104 A1    May 24, 2018

Related U.S. Application Data

(63) Continuation-in-part of application No. 14/627,199, filed on Feb. 20, 2015, now Pat. No. 9,881,403.

(60) Provisional application No. 61/942,700, filed on Feb. 21, 2014.

(51) Int. Cl.
| | |
|---|---|
| *H04N 1/00* | (2006.01) |
| *H04W 4/021* | (2018.01) |
| *G06F 16/58* | (2019.01) |

(52) U.S. Cl.
CPC ......... *H04N 1/00167* (2013.01); *G06F 16/58* (2019.01); *H04N 1/00185* (2013.01); *H04W 4/021* (2013.01); *G06T 2200/24* (2013.01)

(58) Field of Classification Search
CPC ............ H04N 1/00167; H04N 1/00185; G06F 16/58; H04W 4/021; G06T 2200/24
See application file for complete search history.

(56) References Cited

U.S. PATENT DOCUMENTS

| | | | |
|---|---|---|---|
| 6,526,158 B1 * | 2/2003 | Goldberg | G03D 15/001 382/115 |
| 7,982,762 B2 | 7/2011 | Chatting et al. | |
| 8,054,343 B2 | 11/2011 | Cheatle et al. | |
| 8,405,740 B2 | 3/2013 | Nichols et al. | |

(Continued)

OTHER PUBLICATIONS

U.S. Appl. No. 15/876,453, filed Jan. 22, 2018.

*Primary Examiner* — Hung H Lam
(74) *Attorney, Agent, or Firm* — Allen, Dyer, Doppelt + Gilchrist, PA (57) ABSTRACT

A photography system includes a remote server to store a database of geofence regions within a geographical area, and themed photograph overlays, with at least one themed photograph overlay corresponding to each respective geofence region within the database. A portable electronic device (PED) includes a processor to execute a creative artworks picture application, a geographic position determining to determine a geographic location of the PED, and a transceiver. The transceiver is configured to transmit the geographic location of the PED to the remote server, and receive the themed photograph overlay from the remote server when the geographic location of the PED is within one of the respective geofence regions. A camera takes a photograph within the geofence region the PED is located in, and a display displays the photograph with the at least one themed photograph overlay.

22 Claims, 11 Drawing Sheets

(56) References Cited

U.S. PATENT DOCUMENTS

| | | |
|---|---|---|
| 2013/0162876 A1 | 6/2013 | Song et al. |
| 2013/0165152 A1* | 6/2013 | Nichols ................ H04L 67/306 |
| | | 455/456.3 |
| 2014/0205196 A1* | 7/2014 | Freedman ............... G06T 11/60 |
| | | 382/217 |
| 2017/0134595 A1* | 5/2017 | Mahar ................ H04N 1/00196 |
| 2017/0257575 A1* | 9/2017 | Kim ........................ G06T 11/60 |

* cited by examiner

PORTABLE ELECTRONIC DEVICE WITH CREATIVE ARTWORKS PICTURE APPLICATION OPERATING IN RESPONSE TO GEOFENCING

RELATED APPLICATION

This application is a continuation-in-part of U.S. patent application Ser. No. 14/627,199 filed Feb. 20, 2015 which claims the benefit of U.S. Provisional Application Ser. No. 61/942,700 filed Feb. 21, 2014, the entire contents of which are incorporated herein by reference.

FIELD OF THE INVENTION

The present invention relates to the field of electronic devices, and, more particularly, to the addition of creative artwork to pictures taken by a portable electronic device.

BACKGROUND OF THE INVENTION

When visiting theme parks, such as Disney and Universal, for example, it is common for guests to be approached by a theme park photographer to have their photograph taken as a souvenir that can later be retrieved at a designated area. For each park guest and their group having their photograph taken, a printed ticket with a number corresponding to their particular photograph is given to them by the theme park photographer.

The number on the printed ticket typically corresponds to a bar code that is associated with the photograph or photographs taken by the theme park photographer of the park guest and their group. A different bar code is used for each park guest and their group having their photograph taken.

To associate the bar codes with the photographs being taken, a personal digital assistant (PDA) is used. Each theme park photographer has a PDA coupled to their camera via an interface cord. The theme park photographer uses the PDA to first read or scan a bar code. The bar code is usually taken from a tablet of bar codes carried by the theme park photographer. After the photographs of a park guest and their group have been taken, they are then transferred to the PDA. The PDA includes software that associates the bar code with the corresponding photographs taken of the park guest. This process is repeated for each group of park guests having their photograph taken.

The theme park photographer later transfers the stored photographs and corresponding bar codes in the PDA to a photography database. Prior to leaving the theme park, the park guest can present their printed ticket at a photography gift shop. The photography database is searched using the number on the printed ticket which corresponds to the bar code used to identify their photographs.

Before the retrieved photograph is printed, the photography gift shop has the capability of adding creative artwork to the photograph. The park guest can select from different borders, logos or icons, for example. A drawback of adding the creative artwork to the photograph at the photography gift shop is that the park guest typically enters the photography gift shop near the end of their visit at the theme park. At this point, the park guest is tired and may not have the patience to go through each of their available photographs and select individualized artwork for each one. In addition, if their ticket is lost or misplaced, the photograph cannot be easily retrieved. Consequently, there is a need to improve how creative artwork can be added to photographs of park guests so as to enhance their theme park experience.

SUMMARY OF THE INVENTION

A photography system includes a remote server to store a database of geofence regions within a geographical area, and a plurality of themed photograph overlays, with at least one themed photograph overlay corresponding to each respective geofence region within the database.

A portable electronic device (PED) includes a processor to execute a creative artworks picture application, a geographic position determining device coupled to the processor to determine a geographic location of the PED, and a transceiver coupled to the processor. The transceiver may be configured to transmit the geographic location of the PED to the remote server, and receive the at least one themed photograph overlay from the remote server when the geographic location of the PED is within one of the respective geofence regions. A camera may be coupled to the processor to take a photograph within the geofence region the PED is located in, and a display may be coupled to the processor to display the photograph with the at least one received themed photograph overlay.

The remote server may be configured to compare the geographic location of the PED to the database of geofence regions so as to determine when the PED is within one of the geofence regions, and if the PED is within one of the geofence regions, then determine the at least one themed photograph overlay that corresponds to the geofence region the PED is within.

The creative artworks picture application may be configured so that a notification may be displayed on the display when the PED is within one of the geofence regions indicating that the PED is within proximity to a picture taking site. The notification may require acknowledgement by a user via an input device before the at least one themed photograph overlay is received from the remote server.

The creative artworks picture application may be configured so that the photograph with the at least one themed photograph overlay is displayed on the display for a set time interval, and after the set time interval, only the photograph without the at least one themed photograph overlay is displayed on the display.

The creative artworks picture application may be configured so that the photograph with the at least one themed photograph overlay is displayed on the display when the PED is within the geofence region, and when the PED is not within the geofence region, then only the photograph without the at least one themed photograph overlay is displayed on the display.

The PED may further include a memory to store the photograph without the at least one themed photograph overlay.

The at least one themed photograph overlay received by the transceiver from the remote server may include a plurality of themed photograph overlays to be displayed on the display, with a user selecting one of the themed photograph overlays to be displayed with the photograph taken by the camera.

The PED may further include an input device coupled to the processor, and the creative artworks picture application may be configured so that a user logs in via the input device before the transceiver receives the at least one themed photograph overlay from the remote server.

The remote server may be configured to store the photograph with the at least one themed photograph overlay in an on-line album assigned to a user operating the PED. The creative artworks picture application may be configured to display on the display other photographs with themed photograph overlays stored in the user's on-line album at the remote server.

The creative artworks picture application may be configured to display an icon for a user to purchase a copy of the photograph with the at least one themed photograph overlay.

The photograph with the at least one themed photograph overlay stored on the remote server may have a link and a thumbnail image associated therewith so that a different PED can display the thumbnail image, and also display the photograph with the at least one themed photograph overlay stored on the server via the link.

The transceiver may be configured to interface with the remote server via at least one of a cellular communications network, a Wi-Fi network and a WiMax network.

The plurality of themed photograph overlays may include a plurality of themed photograph border overlays.

The geographical area may include at least one of theme parks, zoos, aquariums, museums, national and state parks, concerts and events.

Another aspect is directed to a personal electronic device as described above with a creative artworks picture application operating in response to geofencing.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
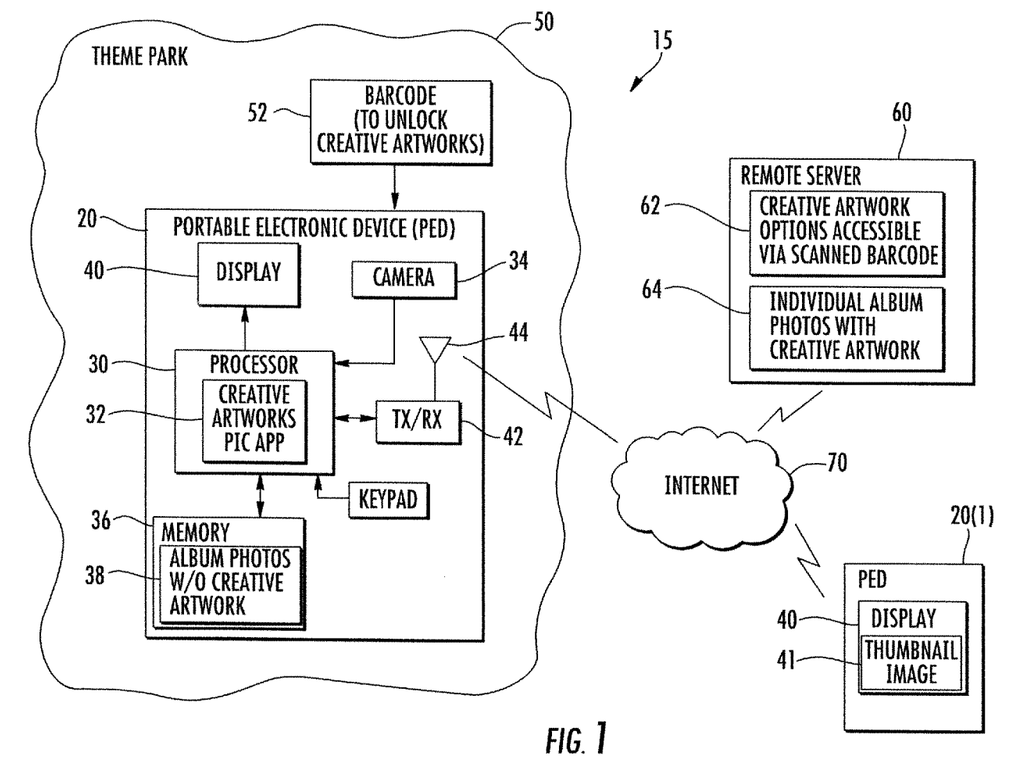
FIG. 1 is a block diagram of a portable electronic device with a creative artworks picture application at a theme park communicating with a remote server in accordance with the present invention.

Referring initially to FIG. 1, a photography system 15 includes a remote server 60 configured to store to a plurality of themed photograph overlays, at least one themed photograph overlay image 52 located at a designated area and corresponding to at least one of the themed photograph overlays on the remote server, and a portable electronic device (PED) 20 that includes a processor 30 configured to execute a creative artworks picture application 32.

The creative artworks picture application 32 is intended for use at an event location 50, such as theme parks, zoos, aquariums, museums, national and state parks, concerts and events, for example. The creative artworks picture application 32 allows creative content 62 to be added to photographs 38 taken by the portable electronic device 20.

The user is also prompted to buy prints of their photographs 38 with the creative content 62, and to also share the photographs 38 with the creative content 62 on social media, such as Facebook and twitter. The creative content 62 may be themed borders, for example, that complement the photographs 38 based on the locations where the pictures were taken.

The photographs 38 are taken by a camera 34 coupled to the processor 30, and are stored in a memory 36 coupled to the processor. Even though the creative artwork 62 is available for a limited time on the user's portable electronic device 20, the creative artwork is not stored in the memory 36 with the photographs 38. Instead, the photographs 38 without the creative artwork 62 are stored in the memory 36. The photographs 38 with the creative artwork 62 are stored external the portable electronic device 20, such as at a remote server 60. More particularly, the photographs 38 taken by the camera 34 with the creative artwork 62 are stored in an individual on-line album 64 for the user at the remote server 60.

A display 40 is coupled to the processor 30 for displaying the photographs 38 with and without the creative artwork 62. The photographs 38 without the creative artwork 62 are available when the portable electronic device 20 is not connected to the remote server 60. When the portable electronic device 20 is connected to the remote server 60, then the photographs 38 with the creative artwork 62 are available via the user's on-line album 64.

For illustration purposes, discussion of the event location 50 will be with reference to a theme park 50. Consequently, the creative artwork 62 is tailored to different themed locations throughout the theme park 50, with each location being considered as a designated area. The creative artwork 62 becomes available for a limited time at the portable electronic device 20 when the camera 34 scans a themed photograph overlay image 52 located at a designated area.

The themed photograph overlay image 52 corresponds to at least one of the themed photograph overlays on the remote server 60, and may be barcode 52, for example. As an alternative to barcodes, other types of coding schemes may be used, such as QR codes, picture codes or framing tokens, for example.

For the creative artwork 62 to be released to the portable electronic device 20, connection to the remote server 60 is needed. The portable electronic device 20 thus includes a transceiver 42 with an antenna 44 coupled thereto. The transceiver 42 is configured to communicate with cellular networks and Wi-Fi/WiMax networks. The cellular networks and Wi-Fi/WiMax networks then access the remote server 60 via the Internet 70.

The portable electronic device 20 thus includes various devices that incorporate a camera therein, such as mobile smart phones or telephones (cellular and PCS), personal digital assistants, wireless email devices, and wireless equipped laptop computers having Wi-Fi/WiMax capability, for example. Moreover, the portable electronic device 20 may be configured as an iPhone, iPad or Andriod device, for example.

For the user to view on their portable electronic device 20 a photograph 38 with the selected creative artwork 62, the user needs to be logged into the creative artworks picture application 32. Once the user is logged in, the portable electronic device 20 is connected to the remote server 60 via a cellular network or a Wi-Fi/WiMax network. This allows the user to view their on-line album 64 for any of the photographs 38 with the creative artwork 62 stored therein.

Before a user can share a photograph 38 with creative artwork 62 from their on-line album 64 on social media, the user needs to have access to the digital rights. The digital rights may be obtained by a number of different methods, such as purchasing them or being an annual park member, for example. Even if the user does not have the digital rights to share a photograph 38 with creative artwork 62 from their on-line album 64, the user is still able to view their album, but the album includes watermarks on the photograph with the creative artwork.

When the user has digital rights to the photographs 38 with creative artwork 62 from their an on-line album 64, and wants to share one or more photographs on social media, such as Facebook and twitter, only a thumbnail image 41 of each photograph 38 with the creative artwork 62 is displayed. When the user's friends click on the thumbnail image 41 on their own portable electronic device 20(1) or fixed electronic device, a link back to the remote server 60 is provided for viewing the photograph 38 with the creative artwork 62 stored in the on-line album 64.

The creative artwork 62 available to the user while at the theme park 50 typically has intellectual property rights and name brand recognition associated therewith. Consequently, the theme park operator would like to maintain as much control as possible over the creative artwork 62, particularly if an inappropriate picture was taken with the creative artwork. This is accomplished by storing the user's photographs 38 along with the creative artwork 62 on the remote server 60 in an on-line album 64 created for each individual user. If an inappropriate picture was taken by a user, then that picture 38 with the creative artwork 62 is removed from the user's on-line album 64 at the remote sever 60.

Figure 2:
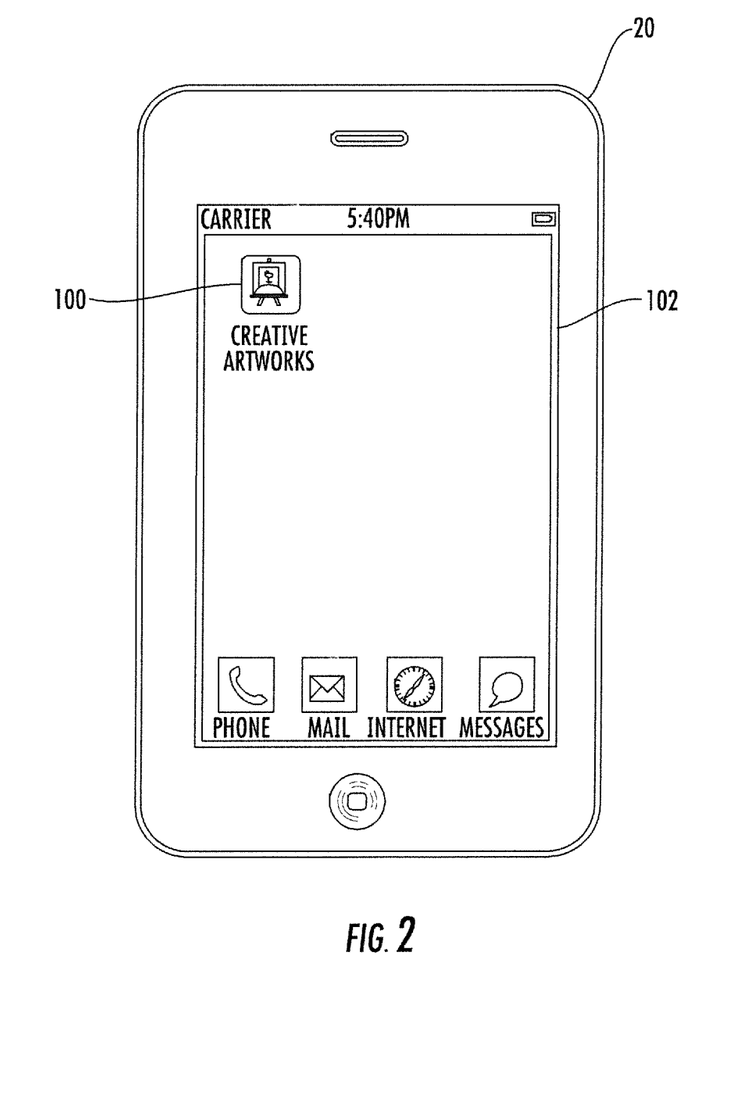
FIG. 2 is a creative artworks picture application icon displayed on the portable electronic device illustrated in FIG. 1.
Figure 3:
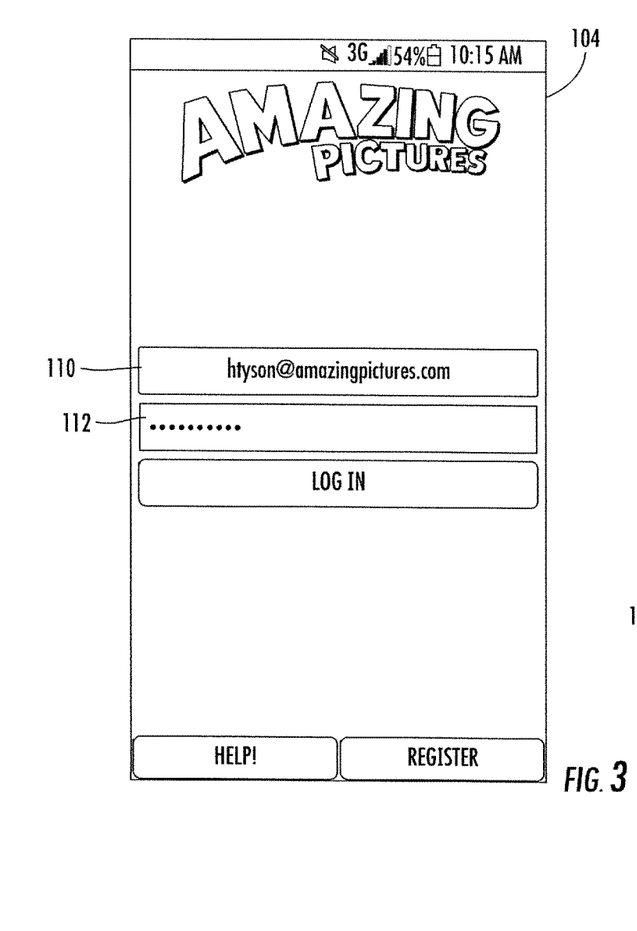
FIG. 3 is a log in screen displayed on the portable electronic device illustrated in FIG. 1.

Operation of the creative artworks picture application 32 will now be discussed in greater detail with reference to FIGS. 2-12. The user initially downloads the creative artworks picture application 32 onto their portable electronic device 20. This may be done at the theme park 50 or prior to the user entering the theme park. The creative artworks picture application 32 appears as an icon 100 on the display screen 102 of the portable electronic device 20, as illustrated in FIG. 2. A log in display screen 104 prompts the user to enter a user name 110 and password 112 to access the creative artworks picture application 32, as illustrated in FIG. 3.

Figure 4:
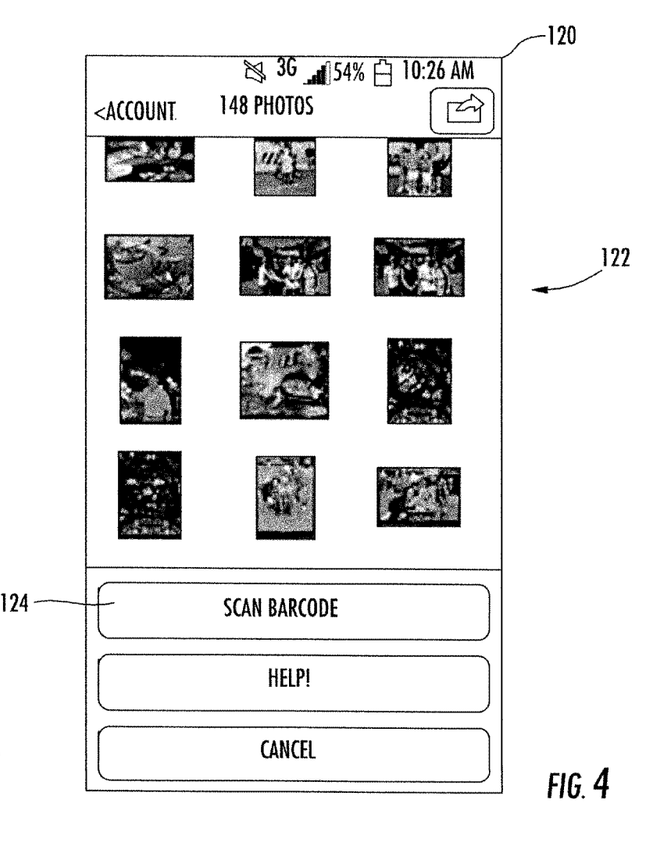
FIG. 4 is a scan barcode screen displayed on the portable electronic device illustrated in FIG. 1.

When the user is ready to take a picture at a particular location within the theme park 50, the user accesses a scan barcode display screen 120, as illustrated in FIG. 4. Since the user is now logged into the creative artworks picture application 32, the scan barcode display screen 120 also displays in a photo viewing section 122 any previously taken photographs 38 with creative artwork 62 stored in the user's on-line album 64 at the remote server 60.

Figure 5:
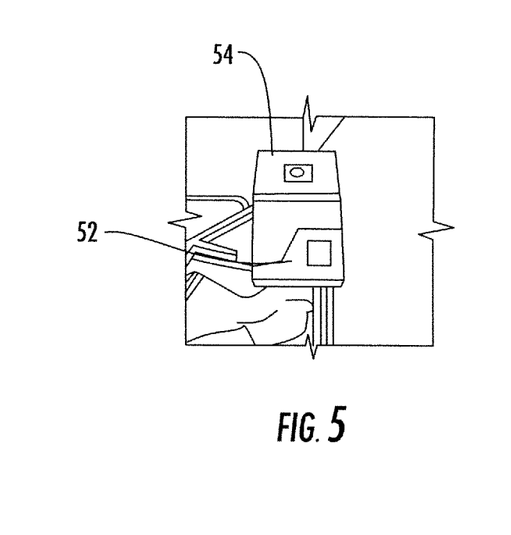
FIG. 5 is a more detailed view of the barcode illustrated in FIG. 1 that is to be scanned by the portable electronic device.

To make the creative artwork 62 at the particular themed location available for viewing, the user selects the scan barcode prompt 124 on the scan barcode display screen 120. The user is then able to scan a barcode 52, as illustrated in FIG. 5. The illustrated barcode 52 is carried by a decorative stand 54 that may also provide instructions for accessing the creative artwork 62 available at this particular location. As an alternative to barcodes, other types of coding, schemes may be used, such a QR codes and picture codes, for example.

Figure 6:
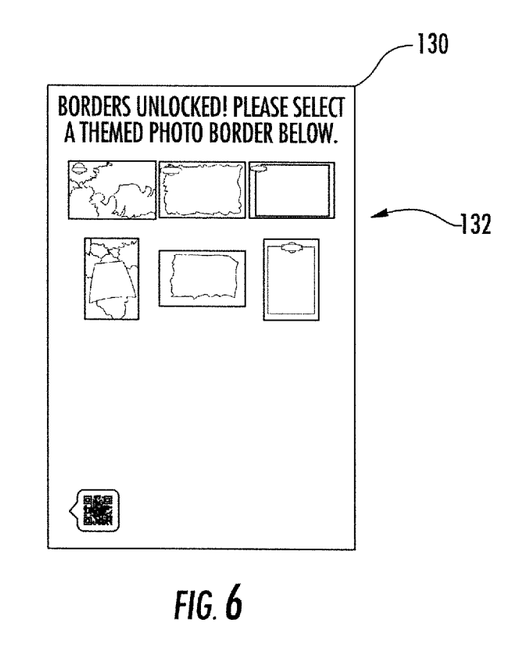
FIG. 6 is a creative artwork options screen displayed on the portable electronic device illustrated in FIG. 1 after scanning the barcode.

Once the user scans the barcode 52, then a creative artwork options screen 130 is displayed, as illustrated in FIG. 6. Included on the creative artwork options screen 130 is a variety of themed borders 132 that the user may select from prior to taking a picture. The themed borders 132 are permanently stored at the remote server 60 as part of the creative artwork 62, but are viewable on the user's portable electronic device 20 for a limited amount of time.

The viewing time for the different themed borders 132 may be 15 minutes, for example. The viewing time is set back at the remote server 60, and may be changed to a different value depending on the location, as readily appreciated by those skilled in the art. The user also has the option of scanning the barcode 52 again if more time is needed.

The objective of setting a time limit is to allow enough time for the user to take a picture without being rushed, and to also prevent the user from having enough time to go to a separate or remote location and take an inappropriate picture with one of the themed borders 132. The time limit thus allows control over use of the themed border 132 as selected by the user.

As an alternative to using a time limit when viewing the available themed borders 132, tracking location of the user's portable electronic device 20 may be used. As long as the user's portable electronic device 20 remains within a certain distance to the barcode 52, such as 50 feet, for example, then the themed borders 132 remain viewable by the user. Once the user exceeds the viewing distance, e.g., 50 feet, from the barcode 52 with their portable electronic device 20, then the themed borders 132 are no longer viewable. The user would have to rescan the barcode 52 and remain within the applicable viewing distance.

Figure 7:
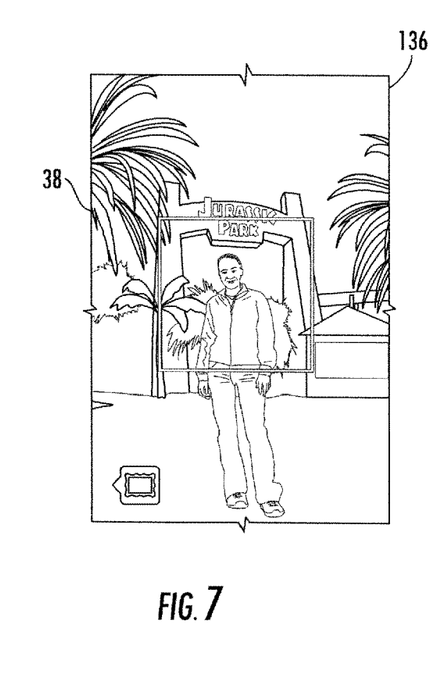
FIG. 7 is a camera display screen for a photograph being taken by the portable electronic device illustrated in FIG. 1.
Figure 8:
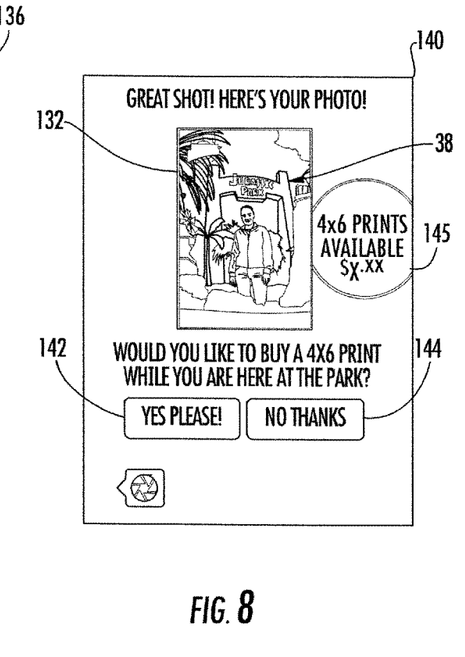
FIG. 8 is a photograph display screen of a picture with the creative artwork selected by the user for the portable electronic device illustrated in FIG. 1.

After selection of the themed border 132, the user then takes a picture, as illustrated by the camera display screen 136 in FIG. 7. The themed border 132 as selected by the user is not visible as the user is taking the picture. Once the picture 38 is taken, as illustrated in FIG. 8, a photograph display screen 140 of the picture 38 with the themed border 132 as selected by the user is provided.

Included on the photograph display screen 140 is an option for the user to purchase a print of the picture 38 with the selected themed border 132. The user will either select the yes prompt 142 or the no prompt 144. If the user selects the yes prompt 142, the print will be available for pickup while at the theme park 50. If the user selects the no prompt 144, the picture 38 with the themed border 132 is still available for viewing at the user's on-line album 64 on the remote server 60. The user also has the option to later order prints of the picture 38 with the themed border 132 even after leaving the theme park 50.

A price icon 145 may also be provided on the photograph display screen 140. The price of the print may vary depending on a number of different options. For example, an annual park member may have a lower print price than a non-annual park member. As another example, the user may have purchased a photo package that includes a certain number of prints. Based on the type of photo package purchased, this information would be provided to the user to help with filling the package as ordered.

Figure 9:
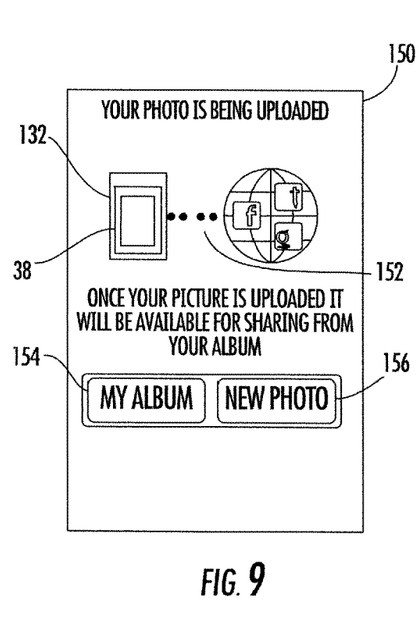
FIG. 9 is an on-line prompt screen for the portable electronic device illustrated in FIG. 1 for uploading a photograph with creative artwork to the remote server.

For the themed border 132 to remain with the photograph 38, the two are loaded to the remote server 60. More particularly, the picture 38 with the themed border 132 is placed in the user's individual on-line album 64, as indicated in the on-line prompt screen 150. As the picture 38 with the themed border 132 is being uploaded, a series of dots 152 is sequenced indicating the process. Once the picture 38 with the themed border 132 has been uploaded, the user has the option to view their on-line album 64 via the my album prompt 154 or take a new photograph via the new photo prompt 156.

Figure 10:
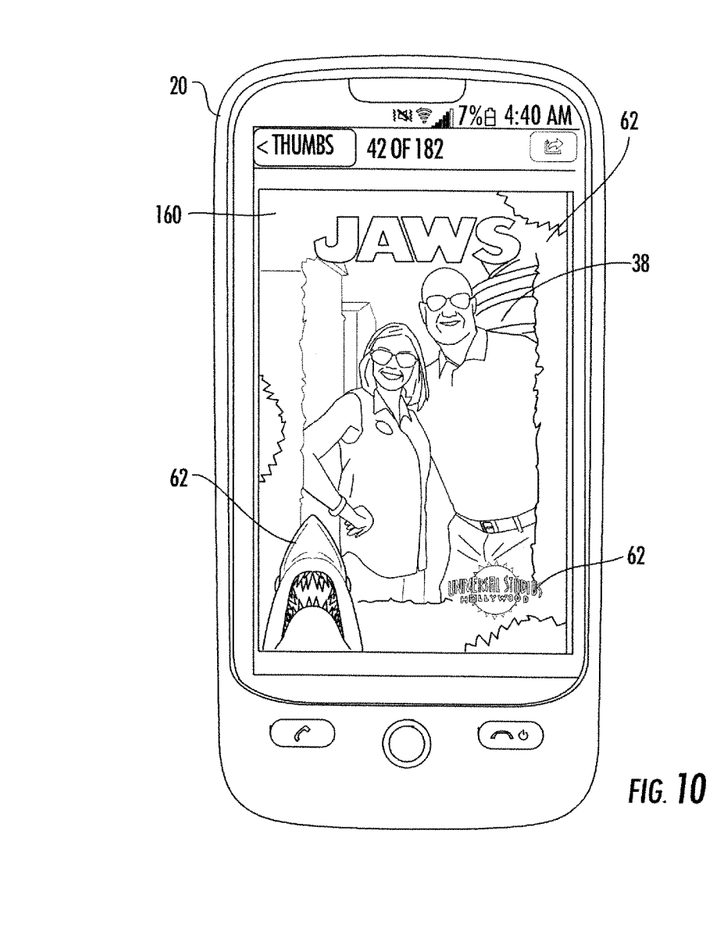
FIG. 10 is another example of a photograph display screen of a picture with creative artwork as selected by the user of the portable electronic device illustrated in FIG. 1.
Figure 11:
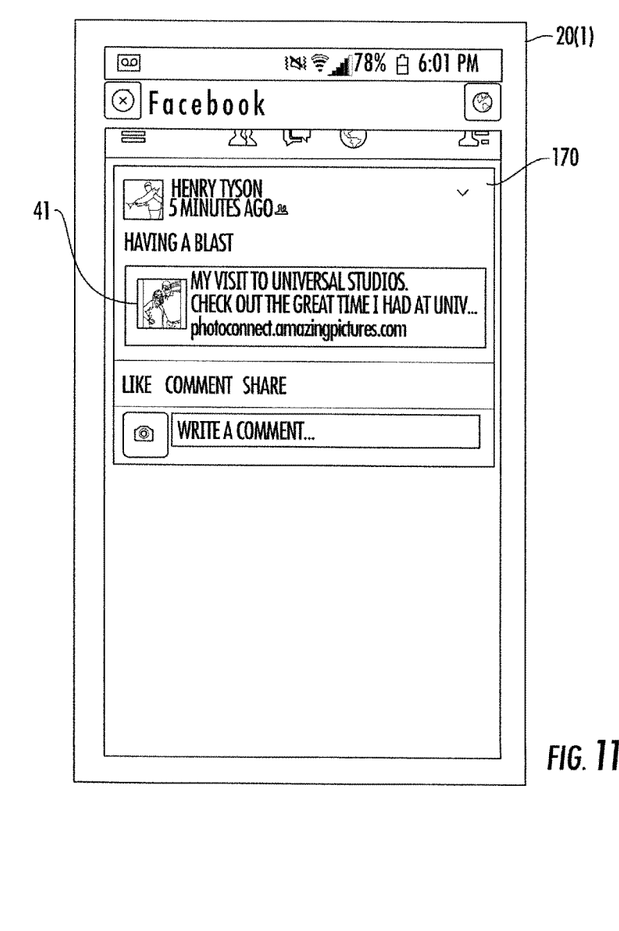
FIG. 11 is a social media display screen of the picture with creative artwork as illustrated in FIG. 10 posted on social media as a thumbnail image.

Another example of a photograph display screen 160 of a picture 38 with creative artwork 62 as selected by the user is illustrated in FIG. 10. Since the user has digital rights to this picture 38 with the creative artwork 62, the user can share the photograph with the creative artwork on social media, such as Facebook, for example. When the user's friend is logged into Facebook on their own portable electronic device 20(1), a thumbnail image 41 of the picture 38 with the creative artwork 62 is displayed on their on-line social media display 170, as illustrated in FIG. 11. When the user's friend clicks on the thumbnail image 41, a link back to the remote server 60 is provided for viewing the photograph 38 with the creative artwork 62 stored in the user's on-line album 64.

Figure 12:
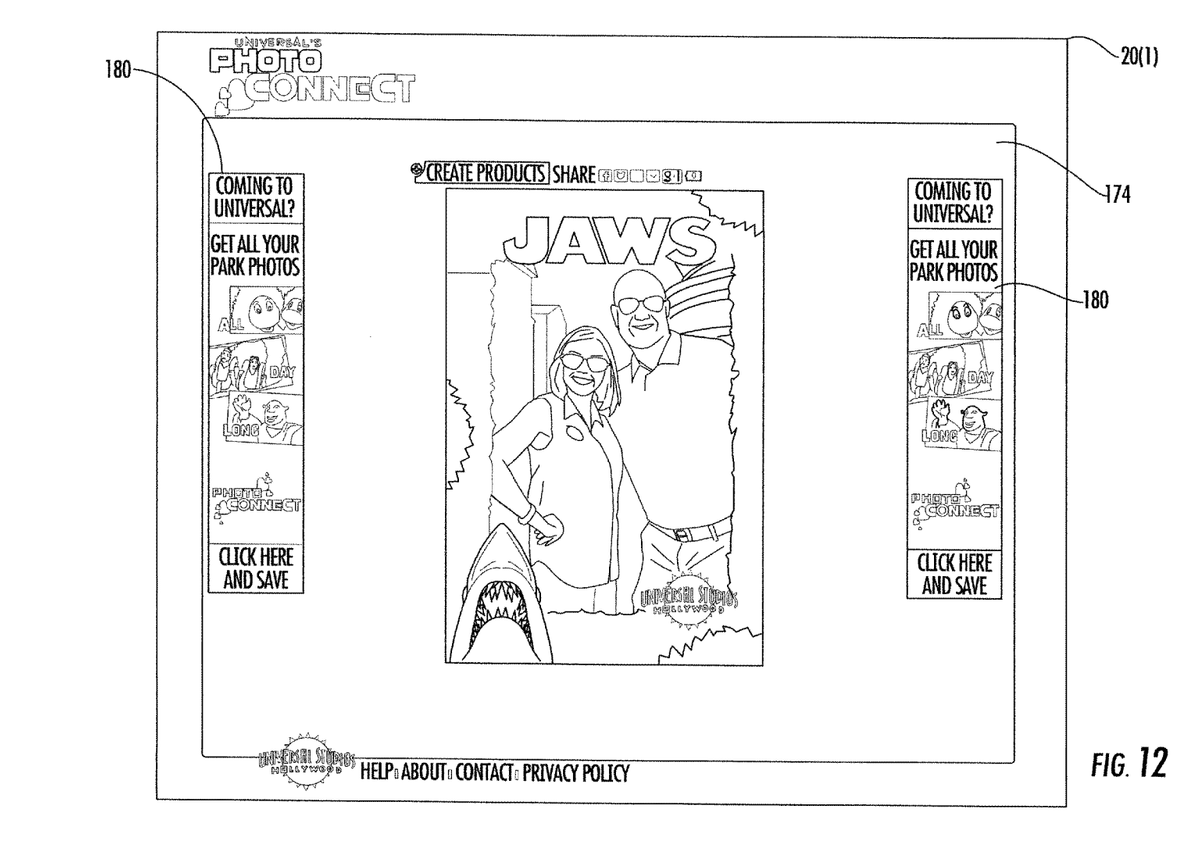
FIG. 12 is a linked social media display screen of the thumbnail image as illustrated in FIG. 11 as viewed on another user's electronic device.

When the user's friend is linked back to the remote server 60 to view the associated photograph 38 with the creative artwork 62, as illustrated by the linked on-line media display screen 174 in FIG. 12, banner adds 180 may be placed on the same screen. This advantageously allows the theme park to advertise by providing additional on-line marketing to other potential park guests.

Another aspect is directed to a non-transitory computer-readable medium having computer-executable instructions for causing a PED 20 to perform steps comprising operating a transceiver 42 coupled to a processor 30 to communicate with a remote server 60, with the remote server storing a plurality of themed photograph overlays 62, and operating a camera 34 coupled to the processor based on user input to scan at least one themed photograph overlay image located at a designated area. The non-transitory computer-readable medium may further comprise operating the transceiver 42 to receive the at least one themed photograph overlay from the remote server 60 based on the camera 34 scanning the at least one themed photograph overlay image, operating the camera based on user input to take a photograph at the designated area, and operating a display 40 coupled to the processor 30 to display the photograph with the at least one themed photograph overlay.

Figure 13:
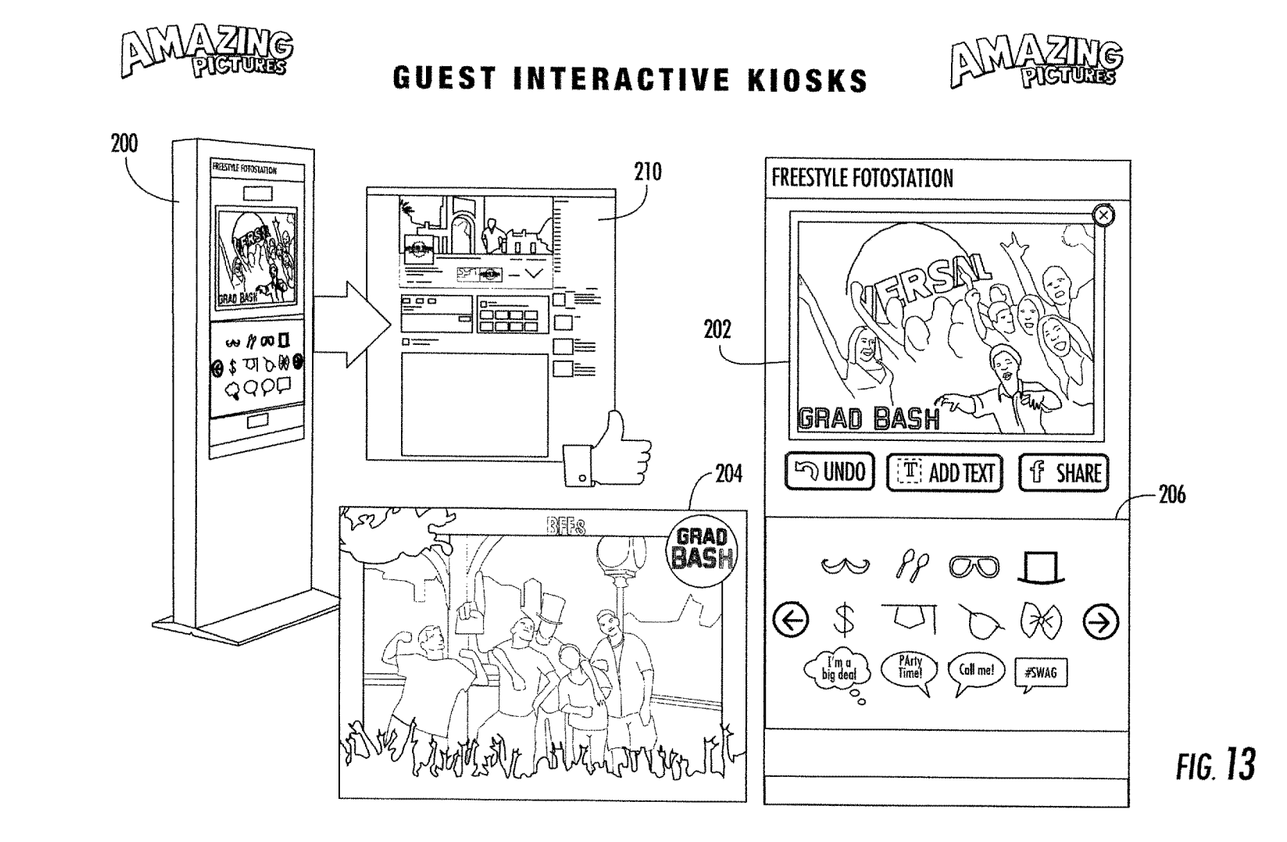
FIG. 13 is a detailed view of a guest interactive kiosk with the creative artworks picture application in accordance with the present invention.

Referring now to FIG. 13, a guest interactive kiosk 200 is equipped with the creative artworks picture application 32. Instead of the park guest using their own portable electronic device 20, the guest interactive kiosk 200 is used for the same function. The guest interactive kiosk 200 includes a camera for taking a picture of the park guests. The park guests are able to select different themed borders, as indicated in pictures 202 and 204. In addition, the available creative artwork, as indicated by reference 206, may be selected and dragged by the park guests into their pictures. If the park guests have purchased the digital rights to the pictures 202 or 204, then they are able to share them on social media, as indicated by the social media screen 210.

Figure 14:
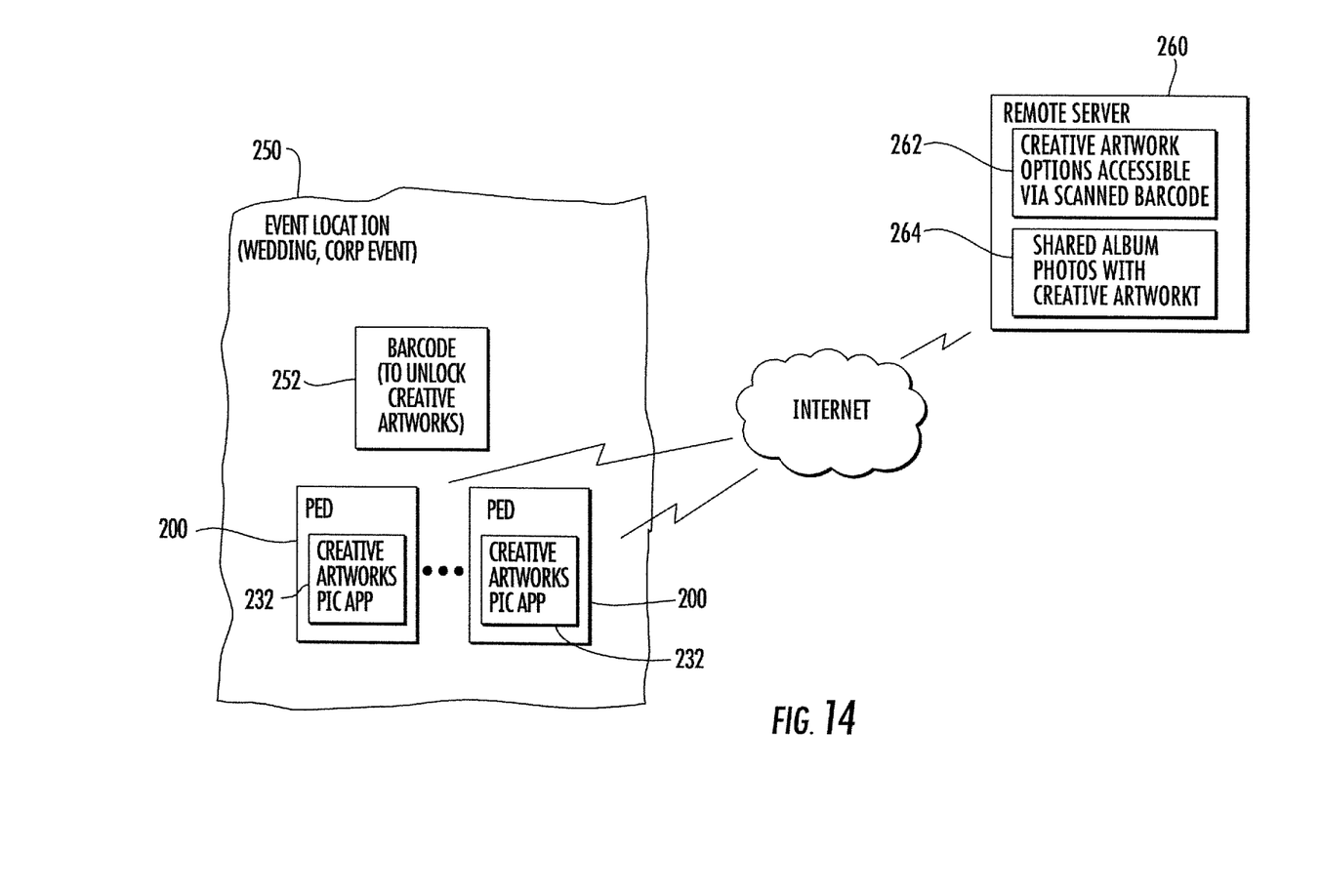
FIG. 14 is a block diagram of another embodiment of portable electronic devices each with a creative artworks picture application at a corporate event communicating with a remote server to collectively share photographs in accordance with the present invention.

Referring now to FIG. 14, another embodiment of portable electronic devices 200 each with a creative artworks picture application 232 communicating with a remote server 260 to collectively share photographs will now be discussed. Instead of the user of each portable electronic device 200 scanning a bar code 252 to access the creative artwork 262 to create an individual on-line album, the photographs 238 taken by each of the portable electronic devices 200 are stored in a shared on-line album 264.

For illustration, the event location 250 may be a wedding or corporate event, for example. While the wedding or corporate event is taking place, photographs 238 with creative artwork 262 taken by the attendees with their portable electronic devices 200 are stored at the remote server 260 in the shared on-line album 264. After the event has ended, no more pictures may be uploaded to the remote server 260.

Attendees and even non-attendees may access the remote server afterwards to view the shared on-line album 264. The attendees and non-attendees have the option to order prints of any of the photographs 238 with the creative artwork 262 stored in the shared on-line album 264, even if they did not take the photograph. This advantageously allows others to have access to a great photograph that they did not take but would still like to have.

Figure 15:
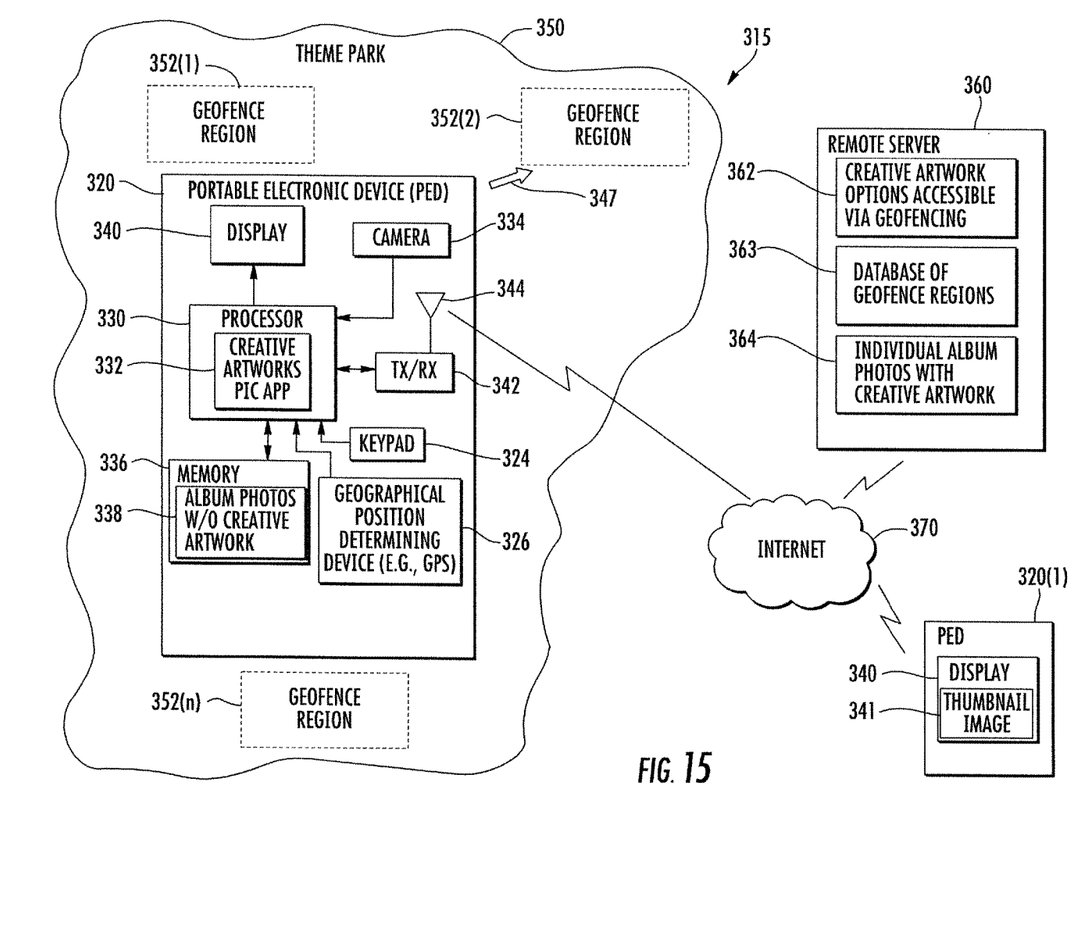
FIG. 15 is a block diagram of a portable electronic device with a creative artworks picture application operating in response to geofencing in accordance with the present invention.

Referring now to FIG. 15, another embodiment of the photography system 315 will be discussed. In this embodiment, the themed photograph overlay images 52 are replaced by geofence regions 352(1)-352(n) within the geographical area 350. The illustrated geofence regions 352(1)-352(n) will be generally referred to as geofence regions 352. Each geofence region 352 has at least one themed photograph overlay image corresponding thereto.

The geofence regions 352(1)-352(n) are part of geofencing, as readily understood by those skilled in the art. Geofencing is a location-based service in which an application uses geographical position data to trigger a pre-programmed action when a mobile device enters or exits a virtual boundary. The virtual boundary is set up around a geographical location, known as a geofence or geofence region 352. Each geofence region 352 is a picture taking site 352.

Still referring to FIG. 15, the photography system 315 includes a remote server 360 configured to store creative content 362, such a plurality of themed photograph overlays 362, and a database of geofence regions 363. The database of geofence regions 363 corresponds to the illustrated geofence regions 352 within the geographical area 350. At least one themed photograph overlay corresponds to each respective geofence region 352 within the database 363.

The photography system 315 further includes at least one portable electronic device 320 that includes a processor 330 configured to execute a creative artworks picture application 332. The portable electronic device 20 also includes a geographical position determining device 326 coupled to the processor 330.

The geographical position determining device 326 determines a geographical position of the PED 320. The geographical position determining device 326 may be a GPS chip set, for example. In the illustrated example, the portable electronic device 320 is heading toward geofence region 352(2), as indicated by arrow 347.

The transceiver 342 transmits the geographic location of the portable electronic device 320 to the remote server 360. The remote server 360 is configured to compare the geographic location of the portable electronic device 320 to the database of geofence regions 363 so as to determine when the portable electronic device 320 is within one of the geofence regions.

Once the portable electronic device 320 enters geofence region 352(2), for example, the remote server 360 determines the at least one themed photograph overlay that corresponds to this geofence region 352(2). Geofence region 352(2) will have at least one themed photograph overlay associated therewith. This themed photograph overlay will be transmitted by the remote server 360 to the transceiver 342.

Figure 16:
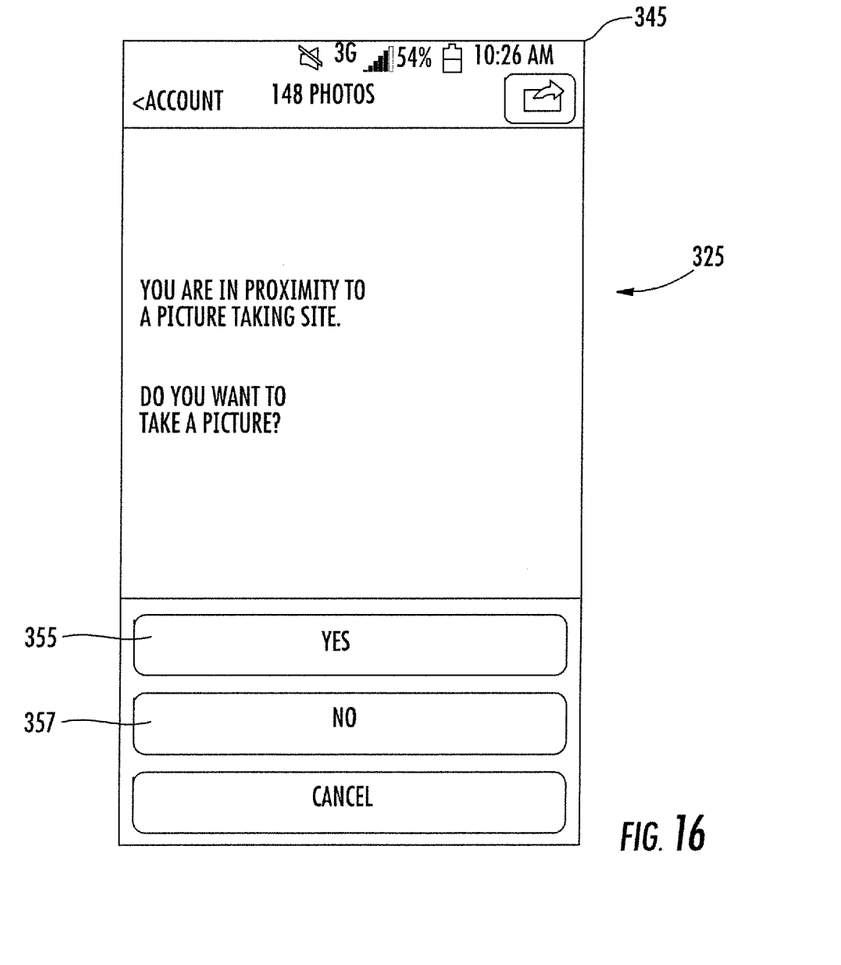
FIG. 16 is a notification display screen for the portable electronic device illustrated in FIG. 15.

The creative artworks picture application 332 is configured so that a notification 325 is displayed on a notification display screen 345 indicating that the personal electronic device 320 is within proximity geofence region 352, as illustrated in FIG. 16.

The notification 325 also asks the user if a picture is to be taken. The notification 325 requires a yes or no acknowledgement by the user. To make the creative artwork 362 at the particular themed location 352 available for viewing, the user selects the yes prompt 355 on the notification display screen 345. If the user does not want to take a picture, then the no prompt 357 is selected.

Once the creative artwork 362 is available for viewing, as in FIG. 6, operation of the creative artworks picture application 332 with the themed photograph overlay image beacons 352 is similar to the discussions directed to FIGS. 6-12. These discussions will not be repeated.

The creative artworks picture application 332 is intended for use at an event location 350, such as theme parks, zoos, aquariums, museums, national and state parks, concerts and events, for example. The creative artworks picture application 332 allows creative content 362 to be added to photographs 338 taken by the portable electronic device 320.

The user is also prompted to buy prints of their photographs 338 with the creative content 362, and to also share the photographs 338 with the creative content 362 on social media, such as Facebook and twitter. The creative content 362 may be themed borders, for example, that complement the photographs 338 based on the locations where the pictures are taken.

The photographs 338 are taken by a camera 334 coupled to the processor 330, and are stored in a memory 336 coupled to the processor. Even though the creative artwork 362 is available for a limited time on the user's portable electronic device 320, the creative artwork is not stored in the memory 336 with the photographs 338. Instead, the photographs 338 without the creative artwork 362 are stored in the memory 336. The photographs 338 with the creative artwork 362 are stored external the portable electronic device 320, such as at the remote server 360. More particularly, the photographs 338 taken by the camera 334 with the creative artwork 362 are stored in an individual on-line album 364 for the user at the remote server 360.

A display 340 is coupled to the processor 330 for displaying the photographs 338 with and without the creative artwork 362. The photographs 338 without the creative artwork 362 are available when the portable electronic device 320 is not connected to the remote server 360. When the portable electronic device 320 is connected to the remote server 360, then the photographs 338 with the creative artwork 362 are available via the user's on-line album 364.

For illustration purposes, the event location 350 may be a theme park. In this example, the creative artwork 362 is tailored to different themed locations throughout the theme park 350, with each location being considered as a designated area. The creative artwork 362 becomes available for a limited time at the portable electronic device 320 when the portable electronic device 320 is within a geofence region 352.

For the creative artwork 362 to be released to the portable electronic device 320, connection to the remote server 360 is needed. The at least one transceiver 342 is configured to communicate with cellular networks and Wi-Fi/WiMax networks. The cellular networks and Wi-Fi/WiMax networks then access the remote server 360 via the Internet 370.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed:

1. A photography system comprising:
a remote server configured to store a database of geofence regions within a geographical area, and a plurality of themed photograph overlays, with at least one themed photograph overlay corresponding to each respective geofence region within the database; and
a portable electronic device (PED) comprising
a processor configured to execute a creative artworks picture application and connect to said remote server once a user is logged into the creative artworks picture application,
a geographic position determining device coupled to said processor and configured to determine a geographic location of said PED,
a transceiver coupled to said processor and configured to
transmit the geographic location of said PED to said remote server, and
receive the at least one themed photograph overlay from said remote server when the geographic location of said PED is within one of the respective geofence regions,
a camera coupled to said processor and configured to take a photograph within the geofence region said PED is located in, and
a display coupled to said processor and configured to display the photograph with the at least one received themed photograph overlay.

2. The photography system according to claim 1 wherein said remote server is configured to compare the geographic location of said FED to the database of geofence regions so as to determine when said FED is within one of the geofence regions; and     if said FED is within one of the geofence regions, then determine the at least one themed photograph overlay that corresponds to the geofence region said FED is within.

3. The photography system according to claim 1 wherein the creative artworks picture application is configured so that a notification is displayed on said display when said FED is within one of the geofence regions indicating that said FED is within proximity to a picture taking site.

4. The photography system according to claim 3 wherein said FED further comprises an input device coupled to said processor, and wherein the notification requires acknowledgement by a user via said input device before the at least one themed photograph overlay is received from said remote server.

5. The photography system according to claim 1 wherein the creative artworks picture application is configured so that the photograph with the at least one themed photograph overlay is displayed on said display for a set time interval, and after the set time interval, only the photograph without the at least one themed photograph overlay is displayed on said display.

6. The photography system according to claim 1 wherein the creative artworks picture application is configured so that the photograph with the at least one themed photograph overlay is displayed on said display when said FED is within the geofence region, and when said FED is not within the geofence region, then only the photograph without the at least one themed photograph overlay is displayed on said display.

7. The photography system according to claim 1 wherein the at least one themed photograph overlay received by said transceiver from said remote server comprises a plurality of themed photograph overlays to be displayed on said display, with a user selecting one of the themed photograph overlays to be displayed with the photograph taken by said camera.

8. The photography system according to claim 1 wherein said FED further comprises an input device coupled to said processor; and wherein the creative artworks picture application is configured so that a user logs in via said input device before said transceiver receives the at least one themed photograph overlay from said remote server.

9. The photography system according to claim 1 wherein said remote server is configured to store the photograph with the at least one themed photograph overlay in an on-line album assigned to a user operating said PED; and wherein the creative artworks picture application is configured to display on said display other photographs with themed photograph overlays stored in the user's on-line album at said remote server.

10. The photography system according to claim 1 wherein the creative artworks picture application is configured to display an icon for a user to purchase a copy of the photograph with the at least one themed photograph overlay.

11. The photography system according to claim 1 wherein the photograph with the at least one themed photograph overlay stored on said remote server has a link and a thumbnail image associated therewith so that a different PED can display the thumbnail image, and also display the photograph with the at least one themed photograph overlay stored on said server via the link.

12. The photography system according to claim 1 wherein said transceiver is configured to interface with said remote server via at least one of a cellular communications network, a Wi-Fi network and a WiMax network.

13. The photography system according to claim 1 wherein the plurality of themed photograph overlays comprise a plurality of themed photograph border overlays.

14. The photography system according to claim 1 wherein the geographical area comprises at least one of theme parks, zoos, aquariums, museums, national and state parks, concerts and events.

15. A portable electronic device (PED) interfacing with a photography system comprising a remote server configured to store a database of geofence regions within a geographical area, and a plurality of themed photograph overlays, with at least one themed photograph overlay corresponding to each respective geofence region within the database, the PED comprising:

a processor configured to execute a creative artworks picture application and connect to the remote server once a user is logged into the creative artworks picture application;

a geographic position determining device coupled to said processor and configured to determine a geographic location of the PED;

a transceiver coupled to said processor and configured to         transmit the geographic location of the PED to said remote server, and         receive at least one themed photograph overlay from said remote server when the geographic location of the PED is within one of the respective geofence regions;

a camera coupled to said processor and configured to take a photograph within the geofence region the PED is located in; and     a display coupled to said processor and configured to display the photograph with the at least one themed photograph overlay.

16. The PED according to claim 15 wherein the creative artworks picture application is configured so that a notification is displayed on said display when the PED is within one of the geofence regions indicating that the PED is within proximity to a picture taking site.

17. The PED according to claim 16 wherein the PED further comprises an input device coupled to said processor, and wherein the notification requires acknowledgement by a user via said input device before the least one themed photograph overlay is received from the remote server.

18. The PED according to claim 15 wherein the creative artworks picture application is configured so that the photograph with the at least one themed photograph overlay is displayed on said display for a set time interval, and after the set time interval, only the photograph without the at least one themed photograph overlay is displayed on said display.

19. The PED according to claim 15 wherein the creative artworks picture application is configured so that the photograph with the at least one themed photograph overlay is displayed on said display when the PED is within the geofence region, and when the PED is not within the geofence region, then only the photograph without the at least one themed photograph overlay is displayed on said display.

20. The PED according to claim 15 wherein the PED further comprises a memory to store the photograph without the at least one themed photograph overlay.

21. The PED according to claim 15 wherein the at least one themed photograph overlay received by said transceiver from said remote server comprises a plurality of themed photograph overlays to be displayed on said display, with a user selecting one of the themed photograph overlays to be displayed with the photograph taken by said camera.

22. The PED according to claim 15 wherein said transceiver is configured to interface with said remote server via at least one of a cellular communications network, a Wi-Fi network and a WiMax network.

* * * * *